(12) United States Patent
Sute

(10) Patent No.: US 9,776,584 B1
(45) Date of Patent: Oct. 3, 2017

(54) VEHICLE COLLISION PREVENTION SYSTEM

(71) Applicant: DENSO International America, Inc., Southfield, MI (US)

(72) Inventor: Steven Sute, Dearborn, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 15/085,483

(22) Filed: Mar. 30, 2016

(51) Int. Cl.
*B60R 19/48* (2006.01)
*H01F 7/06* (2006.01)

(52) U.S. Cl.
CPC ........... *B60R 19/483* (2013.01); *H01F 7/064* (2013.01)

(58) Field of Classification Search
CPC .............................. B60R 19/483; H01F 7/064
See application file for complete search history.

(56) References Cited

U.S. PATENT DOCUMENTS

| 8,403,402 | B1 | 3/2013 | Portela | |
|---|---|---|---|---|
| 2012/0300072 | A1* | 11/2012 | Kim | B60R 1/00 348/148 |

FOREIGN PATENT DOCUMENTS

CN  201071026 A1 * 8/2007 ............ B60R 21/00

\* cited by examiner

*Primary Examiner* — Michael D Lang
(74) *Attorney, Agent, or Firm* — Harness, Dickey & Pierce, P.L.C.

(57) ABSTRACT

A magnetic repulsion system including a front electromagnet at a front, and a rear electromagnet at a rear, of a primary vehicle. A communication module is configured to determine whether a secondary vehicle directly adjacent to the primary vehicle is equipped with a secondary magnetic repulsion system. A sensor module of the primary vehicle is configured to identify when a collision between the primary vehicle and the secondary vehicle directly adjacent to the primary vehicle is imminent. A control module of the primary vehicle is configured to activate the front or rear electromagnet of the primary vehicle that is opposite to the secondary vehicle when both the sensor module identifies that a collision between the primary vehicle and the secondary vehicle directly adjacent to the primary vehicle is imminent, and the communication module receives notification that the secondary vehicle is equipped with the secondary magnetic repulsion system.

15 Claims, 3 Drawing Sheets

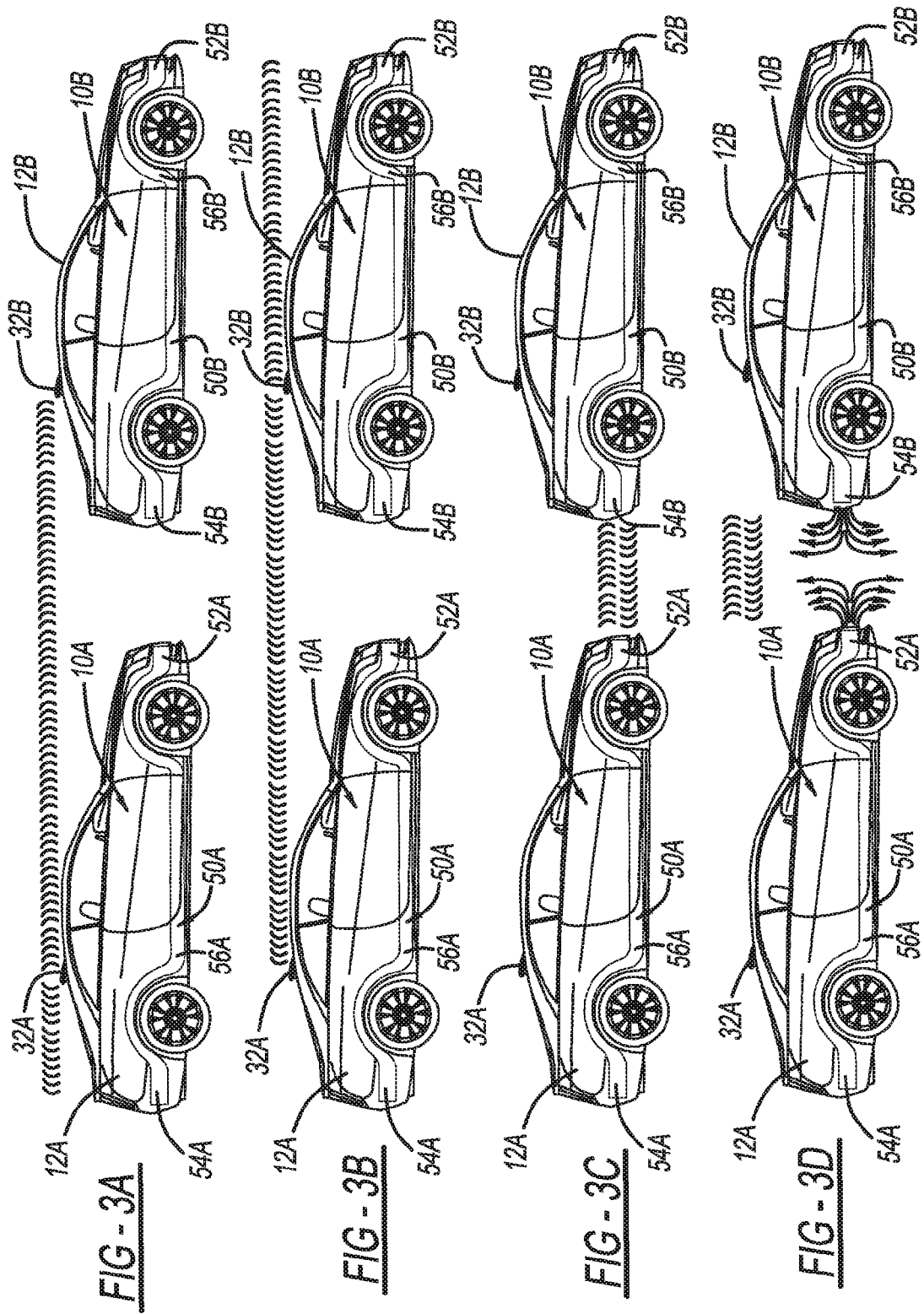

VEHICLE COLLISION PREVENTION SYSTEM

FIELD

The present disclosure relates to a vehicle collision prevention system.

BACKGROUND

This section provides background information related to the present disclosure, which is not necessarily prior art.

Vehicles include various safety features to help drivers avoid collisions, and protect vehicle occupants should a collision occur. While current safety systems are suitable for their intended use, they are subject to improvement. For example, a safety system that activates to prevent vehicles from colliding when a collision appears imminent would be desirable. The present teachings include a vehicle collision prevention system that provides numerous advantages over current safety systems, and fulfills various needs in the art.

SUMMARY

This section provides a general summary of the disclosure, and is not a comprehensive disclosure of its full scope or all of its features.

The present teachings provide for a magnetic repulsion system for preventing vehicle collisions. The system includes a front electromagnet at a front, and a rear electromagnet at a rear, of a primary vehicle. A communication module of the primary vehicle is configured to determine whether a secondary vehicle directly adjacent to the primary vehicle is equipped with a secondary magnetic repulsion system. A sensor module of the primary vehicle is configured to identify when a collision between the primary vehicle and the secondary vehicle directly adjacent to the primary vehicle is imminent. A control module of the primary vehicle is configured to activate the front or rear electromagnet of the primary vehicle that is opposite to the secondary vehicle when both the sensor module identifies that a collision between the primary vehicle and the secondary vehicle directly adjacent to the primary vehicle is imminent, and the communication module receives notification that the secondary vehicle is equipped with the secondary magnetic repulsion system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 3A illustrates a primary vehicle and a secondary vehicle each including a magnetic repulsion system according to the present teachings, the primary vehicle transmitting a message to the secondary vehicle informing the secondary vehicle that the primary vehicle is equipped with a primary magnetic repulsion system according to the present teachings;

FIG. 3B illustrates the primary and the secondary vehicles of FIG. 3A, the secondary vehicle transmitting a message to the primary vehicle to inform the primary vehicle that the secondary vehicle is equipped with a secondary magnetic repulsion system according to the present teachings;

FIG. 3C illustrates detection of an imminent collision between the primary and the secondary vehicles, the imminent collision detected by at least one of the primary and secondary magnetic repulsion systems; and FIG. 3D illustrates the primary and the secondary magnetic repulsion systems activated to prevent a collision between the primary and the secondary vehicles.

Corresponding reference numerals indicate corresponding parts throughout the several views of the drawings.

DETAILED DESCRIPTION

Example embodiments will now be described more fully with reference to the accompanying drawings.

Figure 1:
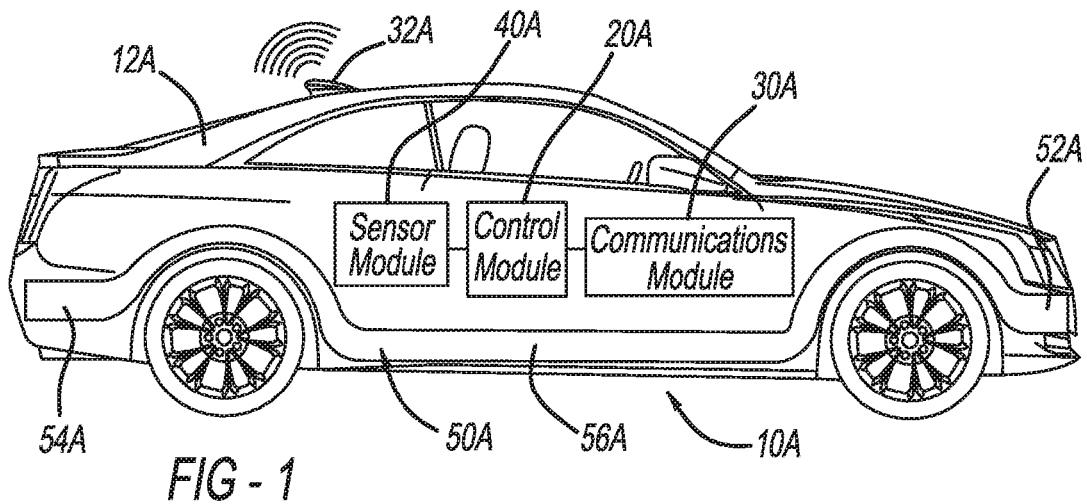
FIG. 1 illustrates an exemplary vehicle including a vehicle collision prevention system according to the present teachings.

With initial reference to FIG. 1, a vehicle collision prevention system in the form of a primary magnetic repulsion system is illustrated at reference numeral 10A. The system 10A is illustrated as present in an exemplary primary vehicle 12A, and can be alternatively arranged in any other suitable vehicle. For example, the system 10A can be included in any suitable passenger vehicle, mass transit vehicle, recreational vehicle, racing vehicle, military vehicle, construction vehicle, train, watercraft, aircraft, etc.

The system 10A is configured to prevent a collision between the primary vehicle 12A and a secondary vehicle 12B including a secondary magnetic repulsion system 10B, as illustrated in FIGS. 3A-3B. The features of the primary system 10A described herein are the same as, or substantially similar to, the features of the secondary system 10B. Therefore, the description of the primary system 10A also applies to the secondary system 10B. Features of the secondary system 10B that are in common with the primary system 10A are designated in the drawings using the same reference numbers, but with the suffix "B" rather than "A."

The primary system 10A generally includes a control module 20A, which is in communication with communications module 30A, antenna 32A, a sensor module 40A, and an electromagnet system 50A. In this application, the term "module" may be replaced with the term "circuit." The term "module" may refer to, be part of, or include processor hardware (shared, dedicated, or group) that executes code. The term "module" may also refer to, be part of, or include memory hardware (shared, dedicated, or group) that stores code executed by the processor hardware. The code is configured to provide the features of the modules, systems, and methods described herein. Although FIG. 1 illustrates the control, communication, and sensor modules 20A, 30A, and 40A as three separate modules, the functionality of any two of the modules 20A, 30A, and 40A can be combined into a single module (e.g., a combined sensor and communications module, a combined sensor and control module, or a combined control and communications module). All three modules 20A, 30A, and 40A can also be combined into one single module (e.g., a combined control, communications, and sensor module).

The communications module 30A is configured to communicate with secondary vehicles adjacent to the primary vehicle 12A, such as the secondary vehicle 12B of FIGS. 3A-3D, to inform the secondary vehicles that the primary vehicle 12A includes the primary magnetic repulsion system 10A. The communications module 30A is configured to communicate with adjacent secondary vehicles in any suitable manner, such as by way of radio communication using the antenna 32A, infrared or visible light communication, sonar, symbol recognition, etc. With respect to radio communication using the antenna 32A, the antenna 32A may be a directional antenna configured to communicate with one or more secondary vehicles directly adjacent to the vehicle 12A to determine exactly which ones, if any, of the secondary vehicles are equipped with a magnetic repulsion system similar to that of the vehicle 12A. The antenna 32A can be configured as a beamforming antenna array rather than a single directional antenna. When configured as a beamforming antenna array, the antenna 32A advantageously provides selectable directionality.

When the communications module 30A is configured to provide infrared or visible light communication, the module 30A can include an LED and photodiode, which can be used for communication in place of the antenna 32A. When the communications module 30A is configured to communicate by way of sonar, the module 30A can include sonic transducers (e.g., speaker and microphone), which can be used for communication in place of the antenna 32A. If the communications module 30A is configured for symbol recognition, module 30A can include a camera configured to recognize a symbol printed at a front, rear, or side of the secondary vehicle, the symbol indicating that the secondary vehicle is equipped with an electromagnetic repulsion system that is compatable with the electromagnetic repulsion system 10A. The symbol can be any suitable indicator recognizable by the camera of communications module 30A.

The communications module 30A is configured to limit communication to secondary vehicles that are immediately adjacent to the vehicle 12A. With respect to the present teachings, immediately adjacent to the vehicle 12A means that no other vehicle is present between the primary vehicle 12A and the adjacent secondary vehicle. The adjacent secondary vehicle(s), such as secondary vehicle 12B, may be directly in front of, behind, or to a side of the primary vehicle 12A. The communications module 30A is configured to determine the location of the adjacent secondary vehicle relative to the primary vehicle 12A (such as in front of, behind, or at a side of the primary vehicle 12A), in order to determine which one or more of electromagnets 52A, 54A, 56A of the electromagnet system 50A to activate, as described herein.

The system 10A is often described herein as a primary magnetic repulsion system, and the vehicle 12A is often described as a primary vehicle in order to distinguish the primary vehicle 12A and the primary magnetic repulsion system 10A thereof from another vehicle that the primary vehicle 12A may be subject to colliding with, such as the secondary vehicle 12B for example. The secondary vehicle may or may not include a secondary magnetic repulsion system, as explained in detail herein.

The sensor module 40A is configured to identify when a collision is imminent between the primary vehicle 12A and a secondary vehicle directly adjacent to the primary vehicle 12A, such as the secondary vehicle 12B. The sensor module 40A can include any suitable equipment configured to determine whether such a collision is imminent, such as any suitable sonar, radar, lidar, and/or camera equipment. The control module 20A is configured to receive inputs from the sensor module 40A indicating the relative positions of the primary vehicle 12A and adjacent secondary vehicle, as well as any other information relevant to determining whether a collision is imminent, such as the headings of the vehicles, the speeds of the vehicles, acceleration data of the vehicles, braking status of the vehicles, as well as any other suitable information. The control module 20A is configured to analyze the inputs from the sensor module 40A to determine whether the collision is imminent.

The control module 20A is generally configured to control each one of the communications module 30A, the sensor module 40A, and the electromagnet system 50A. The control module 20A is in receipt of inputs from the communications module 30A, such as inputs received from adjacent secondary vehicles indicating whether or not the adjacent secondary vehicles are equipped with a magnetic repulsion system that is the same as, or compatible with, the system 10A. The control module 20A can then operate the electromagnet system 50A based on whether or not the adjacent secondary vehicle includes a magnetic repulsion system or not, as described herein.

The electromagnet system 50A includes any suitable number of electromagnets arranged at any suitable location about the vehicle 12A suitable for interacting with an active electromagnet of an adjacent secondary vehicle in order to prevent the vehicles from colliding with one another when an imminent collision is detected. For example, the electromagnet system 50A can include a front electromagnet 52A at a front of the vehicle 12A and a rear electromagnet 54A at a rear of the vehicle 12A. The electromagnet system 50A may further include a side electromagnet 56A on one or both sides of the vehicle 12A. The control module 20A controls the electromagnetic system 50A so as to only activate the electromagnet 52A, 54A, and/or 56A proximate to where a collision is imminent with a secondary vehicle equipped with its own electromagnetic repulsion system.

Activation of the electromagnet system 50A is controlled by the control module 20A. Specifically and as described further herein, the control module 20A activates one or more of the electromagnets 52A, 54A, and 56A of the electromagnet system 50A when: (1) based on inputs from the communications module 30A the control module 20A determines that the adjacent secondary vehicle is equipped with a magnetic repulsion system similar to, or the same as, the primary magnetic repulsion system 10A; and (2) based on inputs from the sensor module 40A the control module 20A determines that a collision between the primary vehicle 12A and the adjacent secondary vehicle is imminent.

With continued reference to FIG. 1, and additional reference to FIGS. 2A, 2B, and 3A-3D, a method 110 for preventing vehicle collisions according to the present teachings using the magnetic repulsion system 10A will now be described in detail. With initial reference to block 112 of FIG. 2A, the method 110 begins when the primary vehicle 12A including the primary magnetic repulsion system 10A is in motion. With reference to block 114, the communications module 30A transmits a message from the primary vehicle 12A to the adjacent secondary vehicle 12B to inform the secondary vehicle 12B that the primary vehicle 12A is equipped with the primary magnetic repulsion system 10A. This transmission from the primary vehicle 12A is illustrated in the example of FIG. 3A. Although the secondary vehicle 12B is illustrated as directly adjacent to the primary vehicle 12A at the front of the primary vehicle 12A, the secondary vehicle 12B may be directly adjacent the primary vehicle 12A at the rear or sides thereof.

Figure 2A:
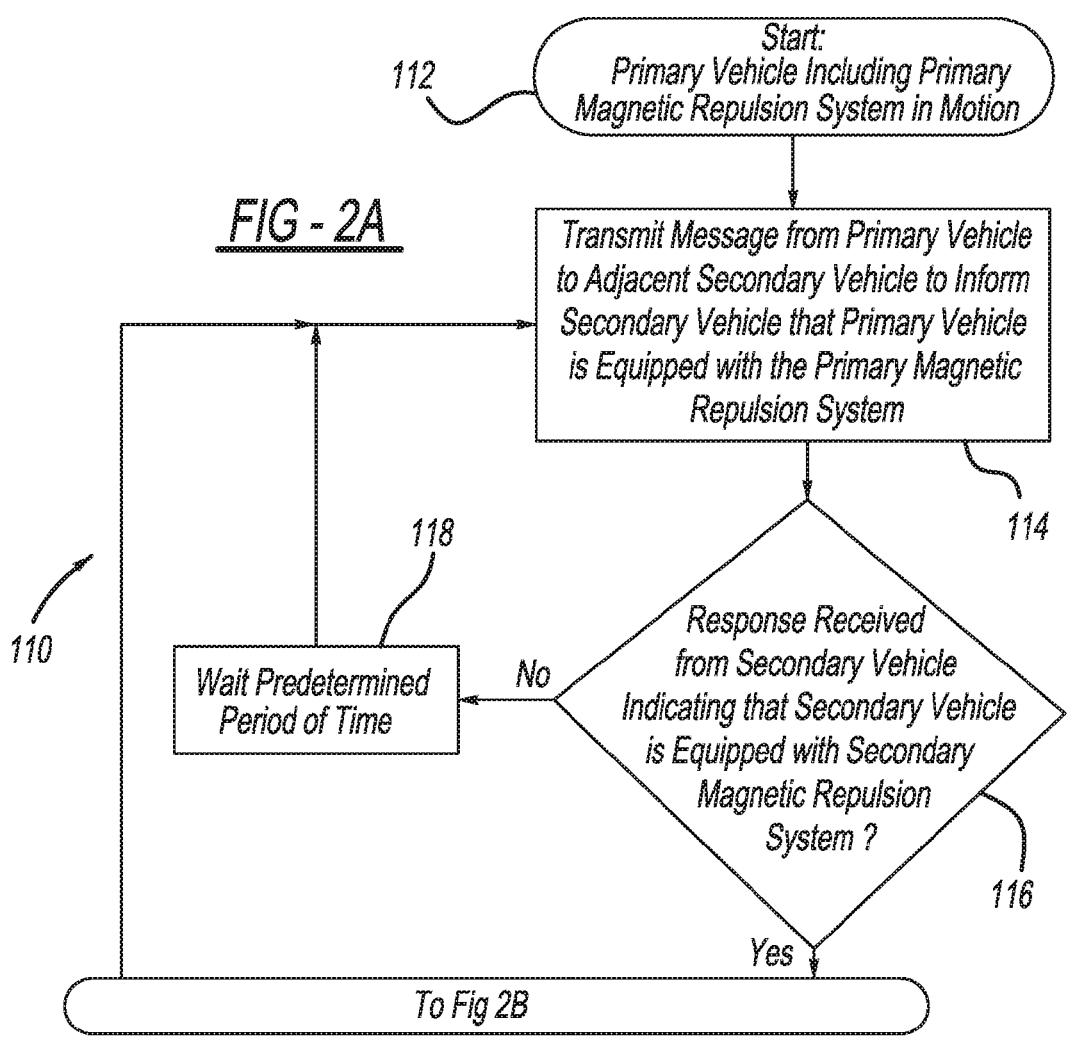
FIG. 2A illustrates a method according to the present teachings for preventing a vehicle collision.
Figure 2B:
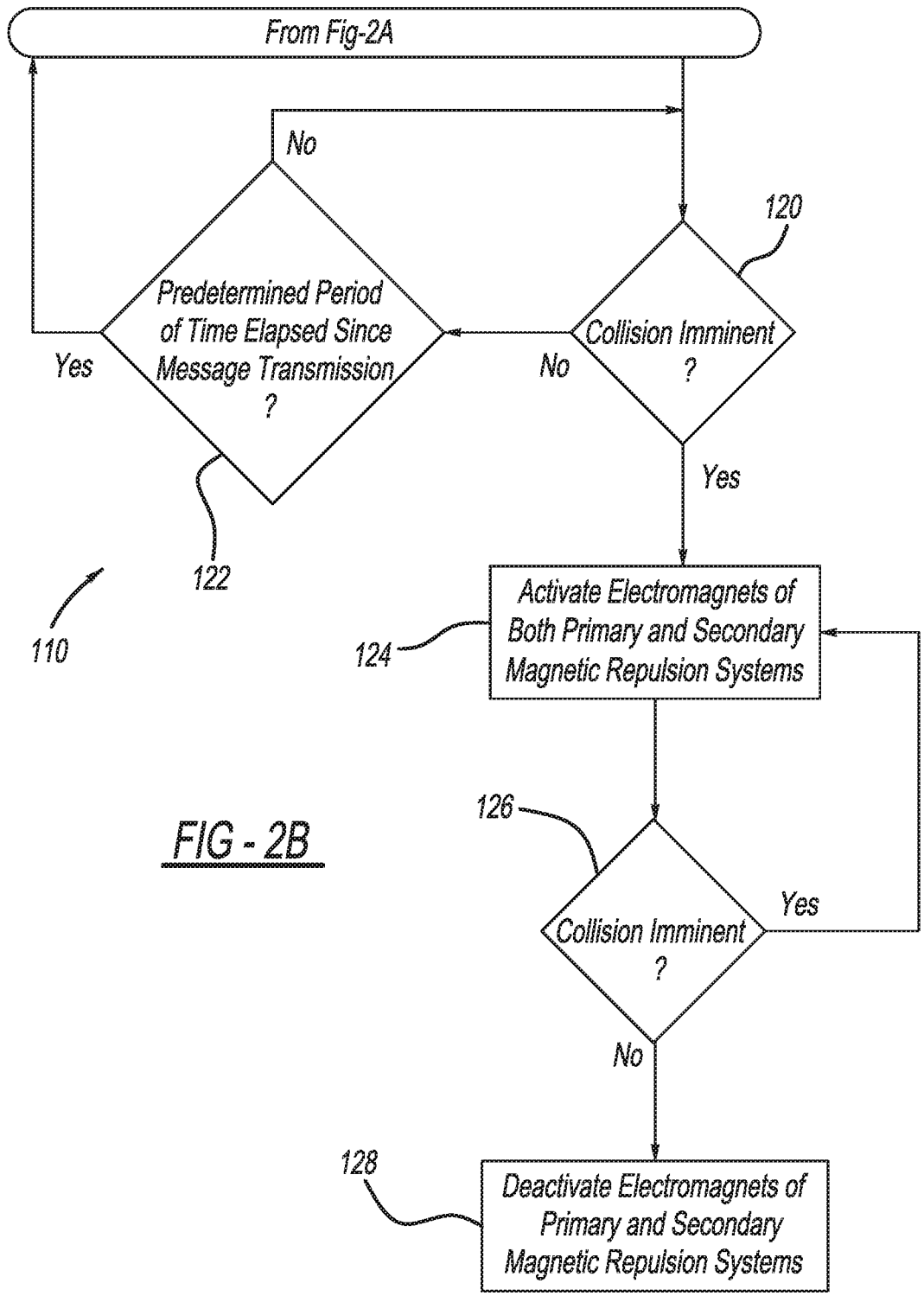
FIG. 2B is a continuation of the method of FIG. 2A for preventing a vehicle collision.

With reference to block 116 of FIG. 2A, the control module 20A monitors inputs to the communications module 30A to determine whether or not a response has been received from the secondary vehicle 12B indicating that the secondary vehicle 12B is equipped with a secondary magnetic repulsion system 10B, which may be the same as, or similar to, the primary magnetic repulsion system 10A. If no response has been received from the secondary vehicle 12B, this indicates that the secondary vehicle 12B is not equipped with the secondary magnetic repulsion system 10B, and the method 110 proceeds to block 118, where the control module 20A waits a predetermined period of time before returning to block 114. If at block 116 the control module 20A detects that the communications module 30A has received a response from the secondary vehicle 12B indicating that the secondary vehicle 12B is equipped with the secondary magnetic repulsion system 10B (as illustrated in FIG. 3B), the method 110 proceeds from block 116 to block 120. Based on inputs from the communications module 30A, the control module 20A determines where the secondary vehicle 12B is in relation to the primary vehicle 12A, such as at a front, rear, right side, or left side of the primary vehicle 12A.

At block 120, based on inputs from the sensor module 40A, the control module 20A determines whether or not a collision between the primary and secondary vehicles 12A and 12B is imminent (see FIG. 3C). If the control module 20A determines that no collision is imminent, the method 110 proceeds to block 122, where the control module 20A continues to monitor inputs from the sensor module 40A to determine whether or not a collision between the primary and secondary vehicles 12A and 12B is imminent. If after a predetermined period of time subsequent to transmission of the message at block 114 no imminent collision has been detected, the method 110 returns to block 114.

If at block 120 the control module 20A determines that a collision is imminent, the method 110 proceeds to block 124. At block 124 the control module 20A activates one or more of the electromagnets 52A, 54A, and 56A opposite to where the secondary vehicle 12B is, and the control module of the secondary magnetic repulsion system 10B activates the appropriate electromagnets 52B, 54B, 56B of the electromagnet system 50B of the secondary vehicle 12B, as illustrated in FIG. 3D. The electromagnet system 50B is activated by a control module of the secondary magnetic repulsion system 10B, which is similar to, or the same as, the control module 20A.

From block 124 the method 110 proceeds to block 126, where the control module 20A continues to determine whether a collision between the primary and secondary vehicles 12A and 12B is imminent. If a collision is still imminent, the method 110 returns to block 124 where activation of the electromagnet systems 50A and 50B is maintained. When at block 126 a collision is determined to be no longer imminent, the method 110 proceeds to block 128 where the control module 20A deactivates the electromagnet system 50A, and the control module of the secondary magnetic repulsion system 10B deactivates the electromagnet system 50B of the secondary vehicle 12B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A magnetic repulsion system for preventing vehicle collisions, the magnetic repulsion system comprising:
    a front electromagnet at a front of a primary vehicle, and a rear electromagnet at a rear of the primary vehicle;
    a communication module of the primary vehicle configured to determine whether a secondary vehicle directly adjacent to the primary vehicle is equipped with a secondary magnetic repulsion system, the communication module periodically transmits a message from the primary vehicle to inform the secondary vehicle and other adjacent vehicles that the primary vehicle is equipped with the magnetic repulsion system regardless of whether a collision is imminent;
    a sensor module of the primary vehicle configured to identify when a collision between the primary vehicle and the secondary vehicle is imminent; and
    a control module of the primary vehicle configured to activate the front or rear electromagnet of the primary vehicle that is opposite to the secondary vehicle when both the sensor module identifies that a collision between the primary vehicle and the secondary vehicle is imminent, and the communication module receives notification that the secondary vehicle is equipped with the secondary magnetic repulsion system;
    wherein the communication module includes at least one of a directional antenna, beamforming antenna array, infrared light communication, visible light communication, sonar communication, and a symbol recognition camera each configured to determine whether the secondary vehicle is equipped with the secondary electromagnet repulsion system.

2. The magnetic repulsion system of claim 1, further comprising a right side electromagnet at a right side of the primary vehicle and a left side electromagnet at a left side of the primary vehicle.

3. The magnetic repulsion system of claim 1, wherein the sensor module includes at least one of sonar, radar, lidar, and a camera.

4. The magnetic repulsion system of claim 1, wherein when the sensor module identifies that a collision between the primary vehicle and the secondary vehicle directly adjacent to the primary vehicle is imminent, the control module is configured to not activate the front and rear electromagnets when the communication module determines that the secondary vehicle is not equipped with the secondary magnetic repulsion system.

5. A magnetic repulsion system for preventing vehicle collisions, the magnetic repulsion system comprising:
    primary electromagnets of a primary vehicle;
    secondary electromagnets of a secondary vehicle;
    a primary communication module of the primary vehicle configured to communicate with a secondary communication module of the secondary vehicle to notify the secondary vehicle that the primary vehicle includes the primary electromagnets, the primary communication module periodically transmits messages from the primary vehicle to inform the secondary vehicle and other adjacent vehicles that the primary vehicle is equipped with the magnetic repulsion system regardless of whether a collision is imminent, the secondary communication module configured to communicate with the primary communication module to notify the primary vehicle that the secondary vehicle includes the secondary electromagnets regardless of whether a collision is imminent; and
    a primary control module of the primary vehicle configured to activate one or more of the primary electromagnets proximate to the secondary vehicle, and a secondary control module of the secondary vehicle configured to activate one or more of the secondary electromagnets proximate to the primary vehicle when a collision between the primary and secondary vehicles is imminent;
    wherein the primary communication module includes at least one of a directional antenna, infrared light communication, visible light communication, sonar communication, and a symbol recognition camera each configured to determine whether the secondary vehicle is equipped with the secondary electromagnets.

6. The magnetic repulsion system of claim 5, wherein the primary electromagnets include a front electromagnet at a front end of the primary vehicle and a rear electromagnet at a rear end of the primary vehicle.

7. The magnetic repulsion system of claim 6, further comprising a left side electromagnet at a left side of the primary vehicle, and a right side electromagnet at a right side of the vehicle.

8. The magnetic repulsion system of claim 5, further comprising a sensor module of the primary vehicle configured to identify an imminent collision between the primary and secondary vehicles.

9. The magnetic repulsion system of claim 8, wherein the sensor module includes at least one of sonar, radar, lidar, and a camera.

10. The magnetic repulsion system of claim 5, wherein the primary control module of the primary vehicle is configured to not activate the primary electromagnets when a collision is imminent between the primary vehicle and a vehicle not equipped with an electromagnet.

11. The magnetic repulsion system of claim 5, wherein the primary communication module and the secondary communication module are configured to determine whether the primary and secondary vehicles are adjacent one another with no other vehicle between the primary and secondary vehicles; and
    the primary and secondary control modules are configured to activate the primary and secondary electromagnets only when no other vehicle is between the primary and secondary vehicles.

12. A method for preventing vehicle collisions comprising:
    transmitting a message from a primary vehicle to an adjacent secondary vehicle informing the secondary vehicle that the primary vehicle is equipped with a primary magnetic repulsion system including one or more primary electromagnets;
    periodically transmitting the message from the primary vehicle to inform the adjacent secondary vehicle and other adjacent vehicles that the primary vehicle is equipped with the primary magnetic repulsion system regardless of whether a collision is imminent;
    determining whether the secondary vehicle is equipped with a secondary magnetic repulsion system including one or more secondary electromagnets regardless of whether a collision is imminent;
    determining whether a collision is imminent between the primary vehicle and the secondary vehicle; and activating one or more of the primary electromagnets of the primary vehicle opposite to the secondary vehicle when collision between the primary vehicle and the secondary vehicle is imminent, and when the secondary vehicle is equipped with the secondary magnetic repulsion system including the one or more secondary electromagnets;

wherein the message is transmitted from the primary vehicle with a primary communication module including at least one of a directional antenna, infrared light communication, visible light communication, sonar communication, and a symbol recognition camera each configured to determine whether the secondary vehicle is equipped with the one or more secondary electromagnets.

13. The method of claim 12, further comprising not activating the one or more primary electromagnets of the primary vehicle when collision between the primary vehicle and the secondary vehicle is imminent, and when the secondary vehicle is not equipped with the secondary magnetic repulsion system including the one or more secondary electromagnets.

14. The method of claim 12, wherein the collision between the primary and secondary vehicles is determined with a sensor module including at least one of sonar, radar, lidar, and a camera.

15. The method of claim 12, further comprising activating one or more of the secondary electromagnets of the secondary vehicle opposite to the primary vehicle when collision between the primary vehicle and secondary vehicle is imminent, and when the secondary vehicle is equipped with the secondary magnetic repulsion system.

* * * * *